United States Patent [19]
Henrion

[11] Patent Number: 5,127,000
[45] Date of Patent: Jun. 30, 1992

[54] RESEQUENCING SYSTEM FOR A SWITCHING NODE

[75] Inventor: Michel A. R. Henrion, Brussels, Belgium

[73] Assignee: Alcatel N.V., Amsterdam, Netherlands

[21] Appl. No.: 566,038

[22] Filed: Aug. 9, 1990

[30] Foreign Application Priority Data

Aug. 9, 1989 [EP] European Pat. Off. .............. PCT/EP89/00941

[51] Int. Cl.⁵ .................................. H04Q 11/04
[52] U.S. Cl. ........................... 370/60; 370/94.1
[58] Field of Search .............. 370/60, 94.1, 799

[56] References Cited

U.S. PATENT DOCUMENTS

| | | | |
|---|---|---|---|
| 4,320,500 | 3/1982 | Barberies | 370/60 |
| 4,322,843 | 3/1982 | Beuscher | 370/60 |
| 4,475,192 | 10/1984 | Fernow | 370/60 |
| 4,491,945 | 1/1985 | Turner | 370/94.1 |
| 4,630,260 | 12/1986 | Toy et al. | 370/94.1 |
| 4,807,224 | 2/1989 | Naron et al. | 370/94.1 |

FOREIGN PATENT DOCUMENTS

| | | |
|---|---|---|
| 8700373 | 3/1985 | European Pat. Off. . |
| 0224895 | 6/1987 | European Pat. Off. . |
| 8400268 | 1/1984 | PCT Int'l Appl. . |
| 0215526 | 1/1987 | PCT Int'l Appl. . |

OTHER PUBLICATIONS

"Techniques for Packet Voice Synchronization" Warren A. Montgommery, IEEE 1983, vol. Sac-1 No. 6, pp. 1022-1028.

N. Shacham, "Packet Resequencing in Reliable Transmission . . . ", IEEE Int'l. Conf. on Comm, 1987, Seattle, WA, vol. 1 of 3, pp. 557-562.

Primary Examiner—Douglas W. Olms
Assistant Examiner—T. Samuel
Attorney, Agent, or Firm—Christie, Parker & Hale

[57] ABSTRACT

Resequencing system for a switching node (SN) of a cell switching system wherein cells or packets, of fixed or variable length, transmitted from an input to an output of a switching network (SNW), are subjected in the network to variable initial time delays for instance because they follow different paths therein. To restore at the output the sequence with which the cells were supplied to the input the cells at the output are subjected to additional variable complementary time delays which are so chosen that for each cell the sum of the two time delays is substantially equal to a predetermined total value.

21 Claims, 6 Drawing Sheets

RESEQUENCING SYSTEM FOR A SWITCHING NODE

TECHNICAL FIELD

The present invention relates to a resequencing system for a switching node of a cell switching system wherein cells transmitted from an input to an output of a switching network are subjected to variable first time delays, said resequencing system being able to restore at said output the sequence with which the cells were supplied to said input.

BACKGROUND ART

Such a resequencing system as part of a multi-stage packet switching network is already known from the PCT application published under No. WO87/00373. For each switch of the switching node shown therein input circuits are coupled to the node inputs and the node outputs are coupled to output circuits. Each output circuit includes an arbiter circuit to which are connected a pair of input circuits and which allows a cell to be transmitted from an input circuit to this output circuit only after having received a transmission request signal from the input circuit and having transmitted a grant signal back to this input circuit. This arbiter circuit performs the correct sequencing of cells by the transmission of grant signals in the correct sequence. Such a resequencing system has a relatively complex structure.

DISCLOSURE OF THE INVENTION

An object of the present invention is to provide a resequencing system of the above type, but which has a relatively simple structure.

According to the invention this object is achieved due to the fact that said resequencing system is able to subject said cells at said output to additional variable second time delays which are so chosen that for each cell the sum of the two time delays is substantially equal to a predetermined total value.

By subjecting each of the cells to a predetermined total time delay the possible loss of sequence is restored in a simple manner and with a probability which is a function of the choice of the duration of this time delay.

It should be noted that the European patent application published under No 0215526 (M. De Prycker 1) already discloses the idea of subjecting cells to a predetermined total delay in their travel from an input to an output of the switching system. However, this is done to smooth the delay jitter to which these cells have been subjected but never to restore at each switching node output the initial sequence at the node input.

Another characteristic feature of the present resequencing system is that it includes:

a time stamp generator producing successive time stamp values;

means coupled to said input to associate to each of the cells supplied thereon a first time stamp value then provided by said generator;

and a resequencing unit coupled to said output to supply a cell received thereon to an output terminal only when said time stamp generator provides a second time stamp value equal to the sum of said first time stamp value and said predetermined total value.

An advantage of this solution is that due to the use of the time stamp generator no means have to be provided to measure the first and second time delays.

Still another characteristic feature of the present sequencing system is that it includes:

means associated to said switching network to measure said first time delay for each of said cells at said output and to associate it to these cells as a first delay stamp value;

and a resequencing unit coupled to said output to subject a cell received thereon to said second time delay equal to the difference of said predetermined total value and said measured first delay stamp value.

An advantage of this solution is that there is no need to use a time stamp generator to distribute the current time value to the inputs and outputs of the switching node.

BRIEF DESCRIPTION OF DRAWINGS

The above mentioned and other objects and features of the invention will become more apparent and the invention itself will be best understood by referring to the following description of embodiments taken in conjunction with the accompanying drawings wherein.

To be noted is that the various connections shown in these drawings as single leads may in fact each comprise a plurality of such leads.

BEST MODE FOR CARRYING OUT THE INVENTION

Figure 1:
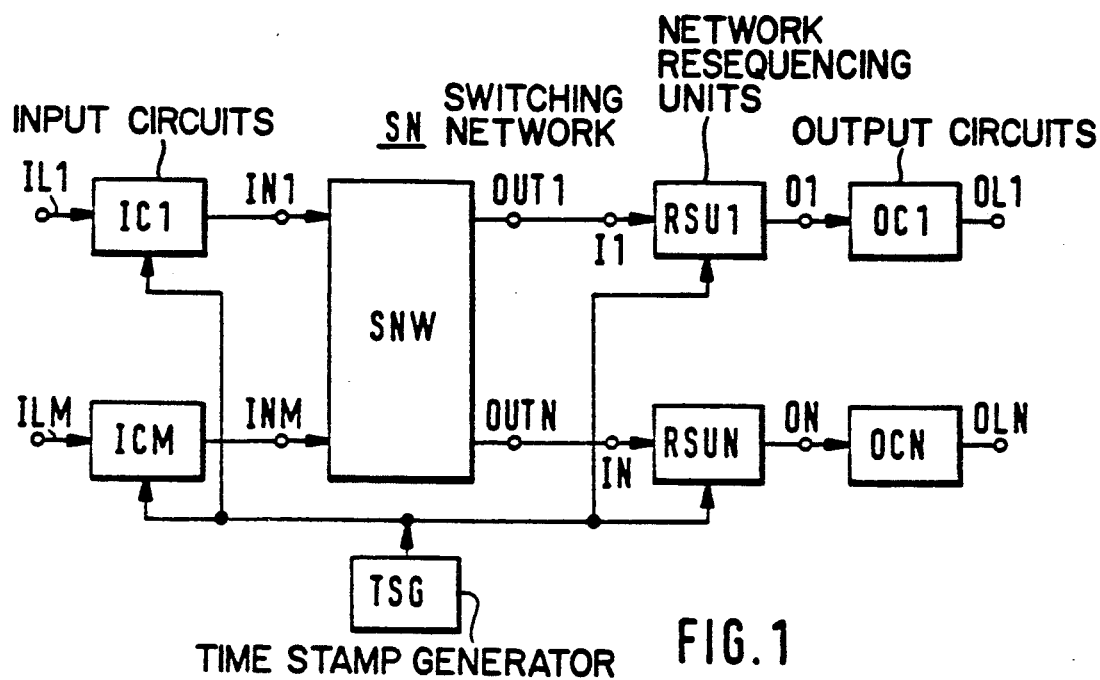
FIG. 1 is a schematic view of a switching node of a cell communication switching system with an associated resequencing system according to the invention and of a first type.

Referring to FIG. 1 the switching node SN shown therein forms part of a cell communication switching system wherein the cells transmitted on links outside these nodes either have a fixed length or a variable length. Inside the nodes these cells are transferred either in the same way as outside the nodes or they are transferred after having been split up in smaller units of equal length, hereinafter called subcells. The subcells belonging to a same cell are either transmitted along the same path or possibly on different paths. In the first case it is necessary to provide sufficient information in the header of the first subcell to be processed and to link all the subcells with one another. In the second case the header of each subcell must contain sufficient information to be processed separately.

The switching node SN shown includes a switching network SNW having inputs IN1/INM to which a plurality of input links IL1/ILM are coupled via respective input circuits IC1/ICM. It also has a plurality of outputs OUT1/OUTN which are each coupled to a respective one of output links OL1/OLN via the cascade connection of a respective resequencing unit RSU1/RSUN and a respective output circuit OC1/OCN. The switching network SNW is supposed to be of a type which includes a plurality of stages (not shown) and wherein a plurality of paths is available between each input IN1/INM and each output OUT1/OUTN.

The switching node also includes a resequencing system mainly constituted by the resequencing units RSU1/RSUN, the time stamp generator TSG and the input circuits IC1/ICM. The time stamp generator TSG operates cyclically and during each cycle of duration D it generates a series of consecutive different time stamp values, e.g. P such values.

When a series of cells is supplied to the switching network SNW on an input link, e.g. IL1, in a predetermined initial sequence it may happen that this sequence is lost during the transfer of the cells through the network. This may for instance be due to the cells following paths of different lengths between each input IN1/INM and each output OUT1/OUTM so that they are subjected to different time delays.

The purpose of the resequencing system shown is to restore the inital sequence, for instance of a series of cells A, B, C supplied to the switching node SN on the input line IL1.

Each such cell A, B, C is processed in the input circuit IC1 which inserts the time stamp value then provided to it by the time stamp generator TSG in the time stamp field TSTP of the header of this cell in a way similar to that described in PCT application published under No. WO84/00268. The time stamp values inserted in the cells A, B, C are for instance equal to TSA, TSB, TSC, ... etc. After these cells A, B, C have been transferred through the switching network SNW they for instance appear at the same output OUT1 thereof in a different order than at the input, e.g. in the order C, B, A because they have been subjected to different first delays in the network. To restore this order the resequencing unit RSU1 coupled to the output OUT1 reads the time stamp value contained in each of the cells C, B, A received, buffers these cells and only transfers them to the associated output circuit OC1 when the current time stamp value supplied to it by the generator TSG reaches the value TSC+D, TSB+D, TSA+D respectively. Because the cells A, B, C have thus been subjected to a same predetermined total delay D, i.e. a variable delay through the switching network SNW plus a compensating delay in the resequencing unit RSU1, their initial order A, B, C is restored.

It is clear that by a suitable choice of the total time delay D the probability that the restoring operation fails may be made negligibly small. This probability would be zero if the total time delay D is selected to be longer than the absolute maximum transfer time delay possibly incurred through the switching network.

Figure 2:
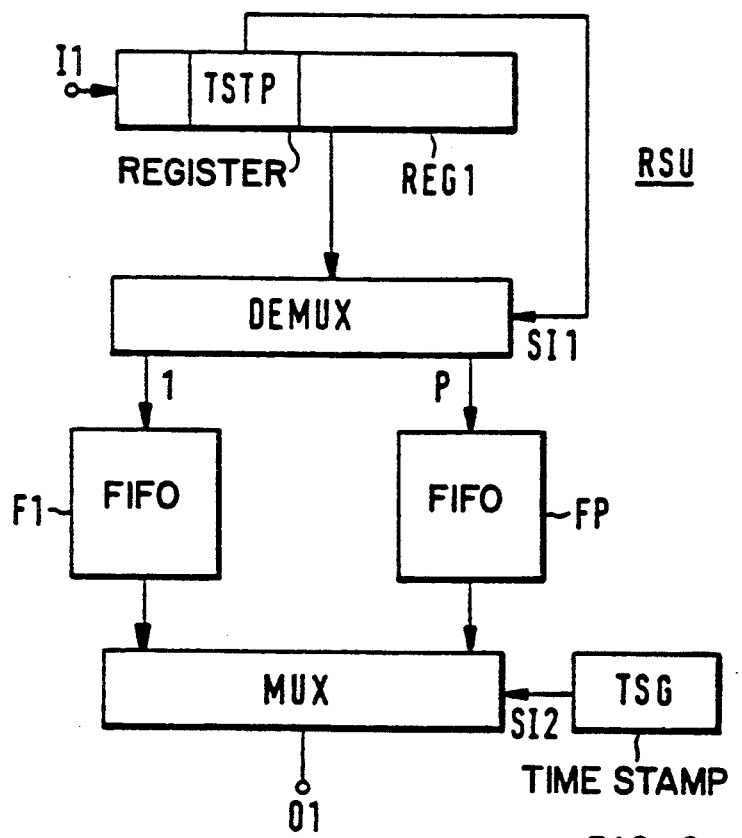
FIGS. 2, 3 and 4 schematically represent a respective first, second and third embodiment of a resequencing unit RSU1 forming part of the resequencing system of FIG. 1.
Figure 3:
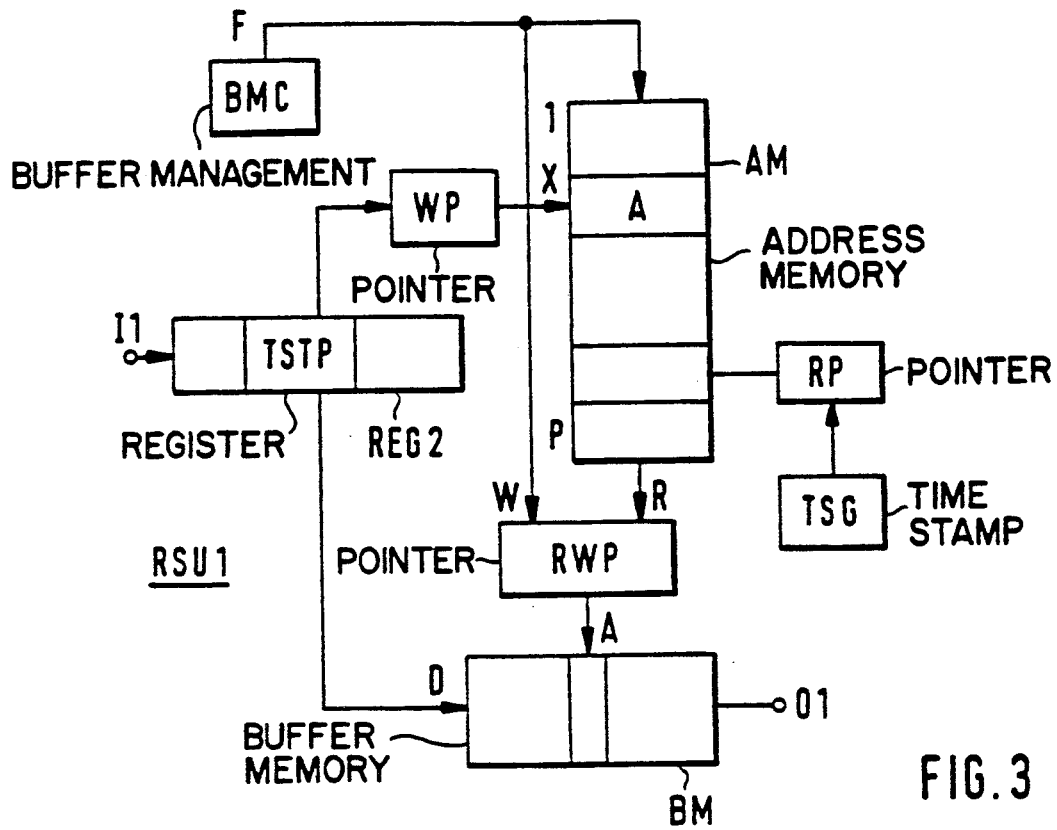
Figure 4:
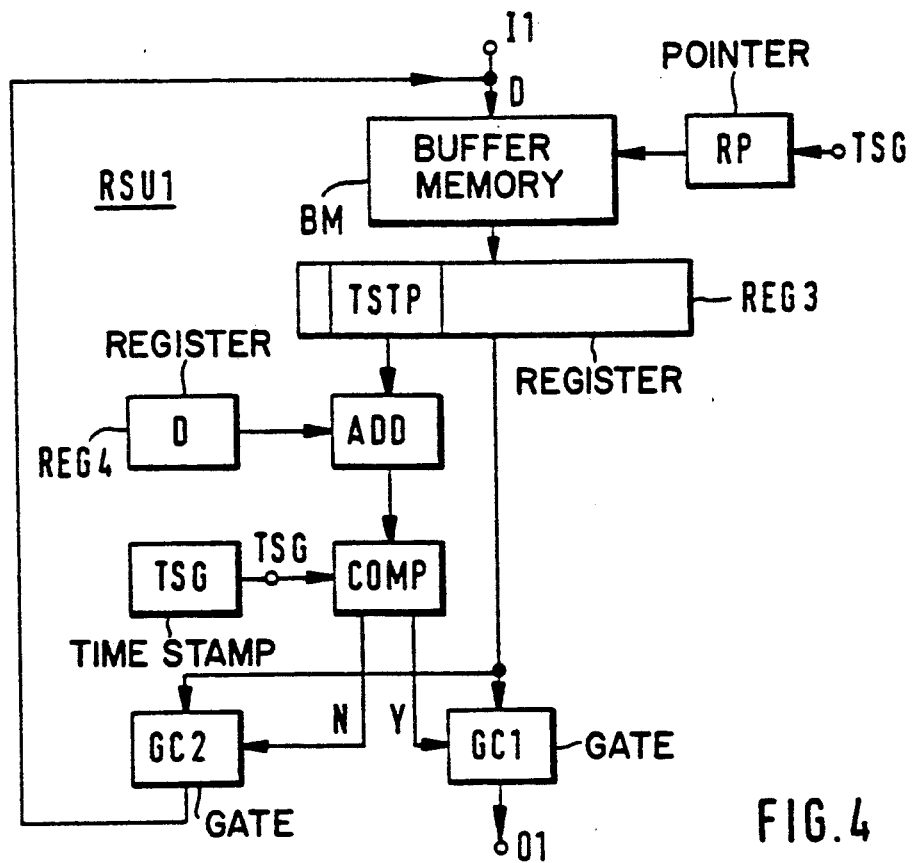

Reference is now made to FIGS. 2 to 4 which show various embodiments of RSU1 of FIG. 1 in relative detail together with the time stamp generator TSG. These resequencing units are all able to ensure that cells are subjected to the above total time delay D before being supplied to the output circuits OC1/OCN. For reasons of simplicity, it is assumed that the cells processed have a fixed length.

Reference is first made to FIG. 2 which shows a first embodiment of RSU1. The input I1 thereof is connected to the input of a register REG1 whose data output is coupled to the input of a demultiplexer circuit DEMUX. The register REG1 has a part TSTP which is intended to store the initial time stamp value of each cell and is connected to the selection input SI1 of the demultiplexer DEMUX. The latter has a number of outputs 1 to P which are connected to respective ones of a plurality of FIFO's F1 to FP. The outputs of these FIFO's are coupled to respective inputs of a multiplexer circuit MUX whose selection input SI2 is controlled by the current value of the time stamp generator TSG. The multiplexer MUX has an output terminal O1 which constitutes the output of RSU1.

When a cell containing a time stamp value in its time stamp field TSTP is received in the register REG1 this time stamp value is applied to the selection input SI1 of the demultiplexer circuit DEMUX. Accordingly this demultiplexer circuit DEMUX selects one of its outputs 1 to P, connects its input therewith and transfers the cell from register REG1 into the FIFO associated with this output.

In this way the various cells applied to input I1 are selectively stored in the FIFO's F1 to FP in function of their time stamp values 1 to P respectively. The selection input SI2 of the multiplexer circuit MUX is now so controlled by the time stamp generator TSG that the outputs of the FIFO's F1 to FP are connected to the output O1 of the multiplexer circuit MUX during the time intervals having the time stamp values 1+D, 2+D, ... etc. It is clear that by proceeding in this way each of the cells is subjected to a total time delay D sufficient to restore the sequence at the output O1 with a predetermined probability.

Reference is now made to FIG. 3 which shows a second embodiment of RSU1 of FIG. 1 in relative detail.

The input I1 of RSU1 is connected to the input of a register REG2 whose data output is connected to the data input D of a RAM buffer memory BM having a data output O1 which constitutes the output of RSU1. The register REG2 has a part TSTP which is intended to store the initial time stamp value of each cell and is connected to a write pointer WP associated to an address memory AM. The latter memory has P locations allocated to respective ones of the time stamp values 1 to P and has an associated rotating or cyclic read pointer RP which is controlled by the time stamp generator TSG and has a cycle equal to D (or P time stamp intervals).

A buffer management circuit BMC is able to provide at its output F the address of a free buffer of the memory BM and is updated each time such a buffer is no longer used in a manner which is not shown here. The output F of BMC is connected to the input of an address memory AM as well as to the write input W of a read/write pointer RWP. The latter also has a read input R to which the output of the memory AM is connected.

When a cell containing an initial time stamp value X (X=1, 2, ... P) in its time stamp field TSTP is received in the register REG2, this time stamp value X is applied to the write pointer WP. Simultaneously, the circuit BMC applies the address, e.g. A, of a free buffer in the buffer memory BM, to the address memory AM as well as to the write input W of the read/write pointer WP. As a consequence, on the one hand the address A of the free buffer is stored in the address memory AM at the location X allocated to the time stamp value X stored in part TSTP of register REG2 under the control of the write pointer WP. On the other hand, the cell stored in the register REG2 is written in the buffer memory BM at the location having the address A provided by the circuit BMC. This happens under the control of the read/write pointer RWP.

Because the time stamp value X is written in the allocated location X of the address memory AM and since the rotating pointer RP points to all these locations during a cycle or total time delay D under the control of the generator TSG, it will point to this location X after this total time delay D has elapsed, independently from the delay to which the cell was subjected in the switching network. Indeed, when TSG generates the time stamp value Y at the moment the address A is stored in the location X of the memory AM this means that the cell being processed has been subjected to a first time delay in the switching network SNW equal to $Y-X$ and that accordingly it has to be subjected to an additional second time delay $D-Y+X$ in the RSU1. This delay is precisely reached when the pointer PR again points to the location X, since to reach this position it has first to step to the end position D via $D-Y$ steps and from that position to the position X through X steps.

From the above it follows that the read pointer RP supplies the address A of the above cell to the read input R of the read/write pointer RWP associated to the memory BM a time interval equal to D after it entered the switching network SNW. As a consequence, it appears at the output O1 of the resequencing unit RSU1 after this same time interval D has elapsed, as required.

It should be noted that a number of cells having the same time stamp value TSTP may be received on the input I1 of the register REG2 and for this reason the address memory AM has to be provided with a number of locations sufficient to store the addresses of these cells. Also because cells having the same time stamp value have in principle to be simultaneously transferred on the output O1—which is impossible—in pratice they have to be buffered. This buffering function may be provided separately or be integrated in the above buffer memory BM or in the FIFO's, and will be considered further in relation to FIG. 10.

Reference is now made to FIG. 4 which represents a third embodiment of RSU1 of FIG. 1 in relative detail.

The input I1 of RSU1 is connected to the data input of a buffer memory BM which is either constituted by a RAM or a FIFO and to which a read pointer RP controlled by the generator TSG is associated. The data output of BM is connected to a register REG3 whose output is connected to the output O1 and to the input I1 of the resequencing unit via gating circuits GC1 and GC2 respectively. The register REG3 has a part TSTP which is intended to store the time stamp value of each cell and is connected to a first input of an adder circuit ADD. The latter has a second input to which the above total time delay D is supplied. The value D is either stored in a register REG4 or alternatively, it can be simply a fixed code in hardware. The output of the adder ADD is connected to a first input of a comparator COMP to a second input of which the time stamp value provided by the generator TSG is applied. The comparator COMP has outputs Y and N controlling the gating circuits GC1 and GC2 respectively. The output of GC2 is fed back to the input I1.

The cells supplied to the input I1 of RSU1 are all stored in free locations of the buffer memory BM, and during each time stamp interval provided by the generator TSG all the cells of the memory BM are cyclically read out under the control of the read pointer RP. Each cell thus read-out is stored in the register REG3 and the time stamp value stored in the field TSTP of this cell is applied to the adder circuit ADD. Therein the total time delay value D is added to the time stamp value of the cell so as to obtain a resultant time stamp value, and by the comparator COMP it is checked if this resultant time stamp value is equal to the current time stamp value or not. In the affirmative the output Y of the comparator is activated, indicating that the cell has been delayed by a total time delay D. In this case the cell is supplied to the output O1 of RSU1 via the enabled gating circuit GC1, whereas in the other case, i.e. when the output N of this comparator COMP is activated, the cell is fed back to the input I1 of BM via the gating circuit GC2.

Hence in the above described way all the cells are subjected to a total time delay D, as required.

Figure 5:
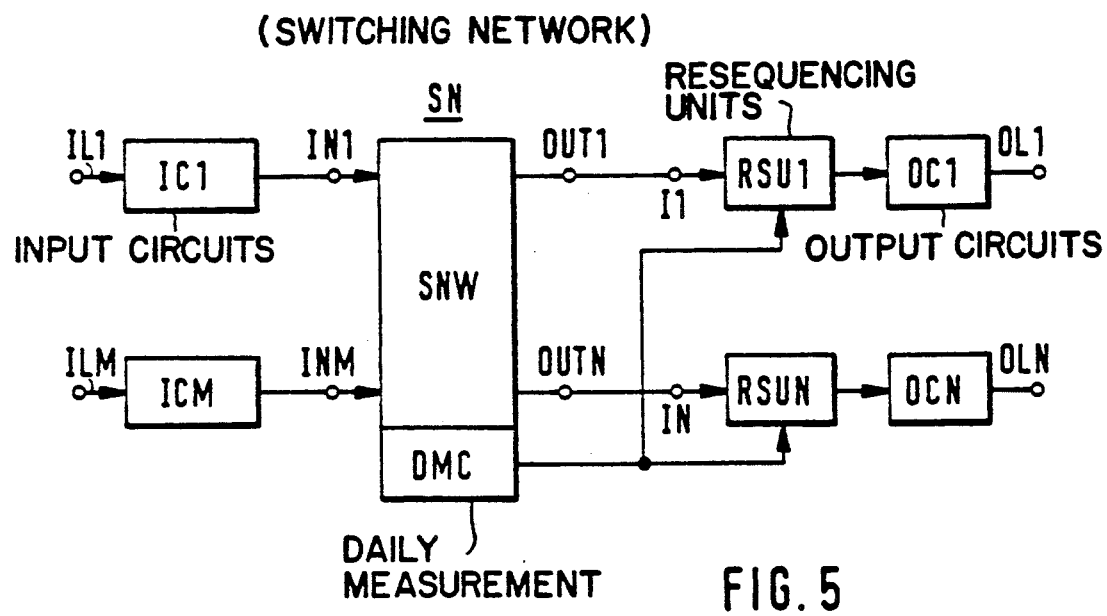
FIG. 5 is a schematic view of a switching node of a cell communication switching system with an associated resequencing system according to the invention and of a second type.

Reference is now made to FIG. 5 which shows a switching node SN identical to that represented in FIG. 1, but associated to a resequencing system which includes the resequencing units RSU1/RSUN and a delay measuring circuit DMC associated to the switching network SNW.

This delay measuring circuit DMC is not shown in detail as it is based on the teachings of the article "Techniques for packet voice synchronization," by W. A. Montgomery, IEEE Journal on Selected Areas in Communication, Vol. SAC-1, No 6, December 1983, pp. 1022-1028 and especially of the chapter entitled "Added Variable Delay" on pp. 1025 and 1026. More particularly the time delay to which each cell is subjected during its travel from stage to stage of the switching network is calculated and the accumulated time delay is inserted in a delay stamp field DSTP of the cell. This means that each cell appearing at an output OUT1/OUTN of the switching network contains in its field DSTP the value of the first time delay to which the cell was subjected during its travel through this switching network SN.

When such a cell is supplied to the resequencing unit RSU1/RSUN connected to an output of SNW, this unit calculates the difference time delay between the above mentioned maximum time delay D and the delay stamp value DSTP and subjects this cell to the difference time delay before supplying it to the output O1/ON of the unit. In this way, just like in the system of FIG. 1, the cells are delayed by a same total time delay D before being supplied to the output circuits OC1/OCN. For this reason any loss of sequence is restored with a predetermined negligibly small probability which is a function of the selected duration of the total time delay.

Figure 6:
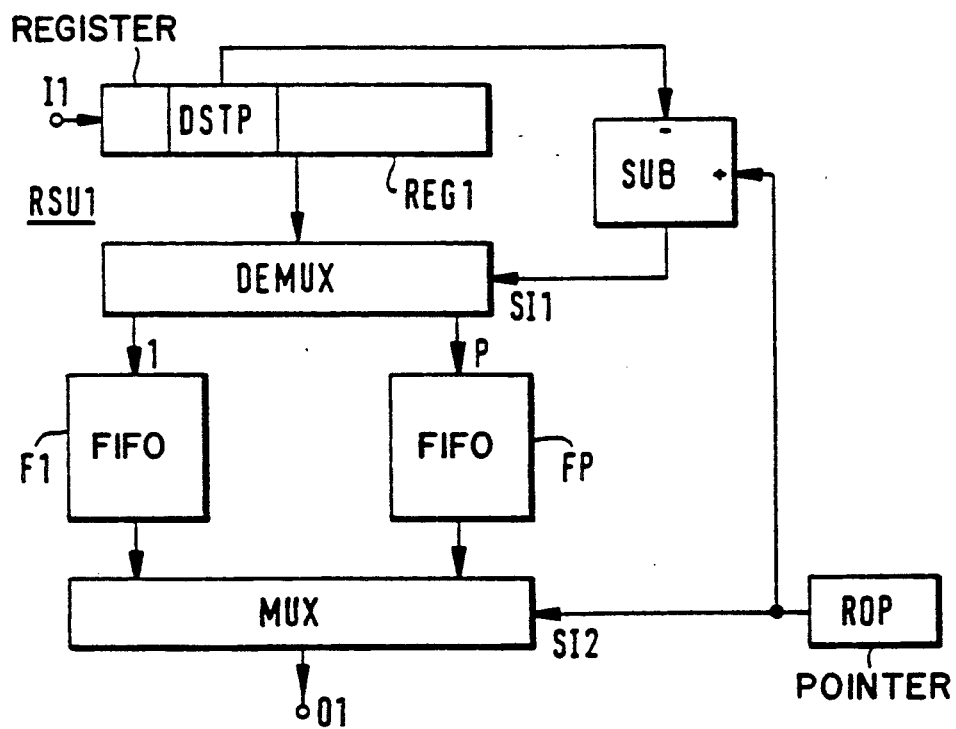
FIGS. 6, 7 and 8 schematically represent a respective first, second and third embodiment of a resequencing unit RSU1 included in the resequencing system of FIG. 5.
Figure 7:
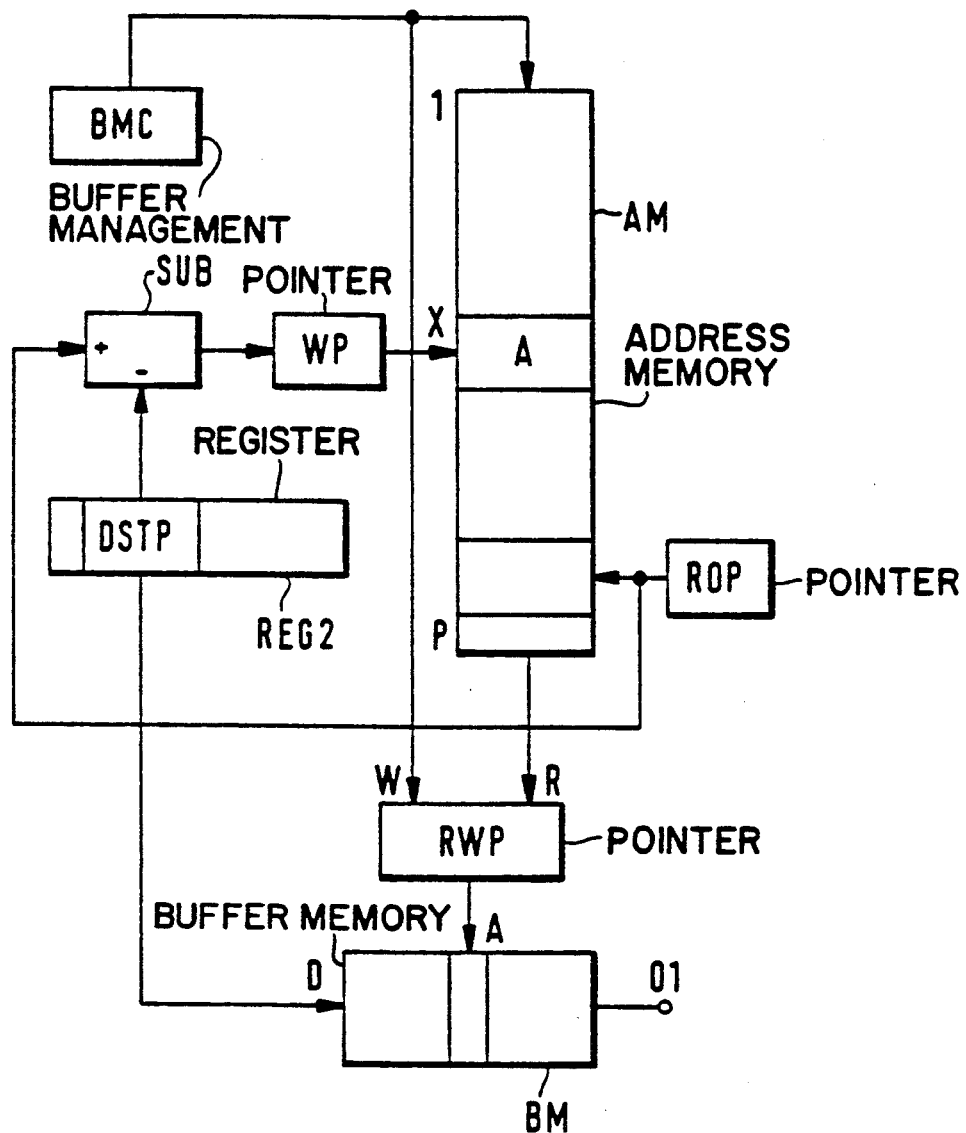
Figure 8:
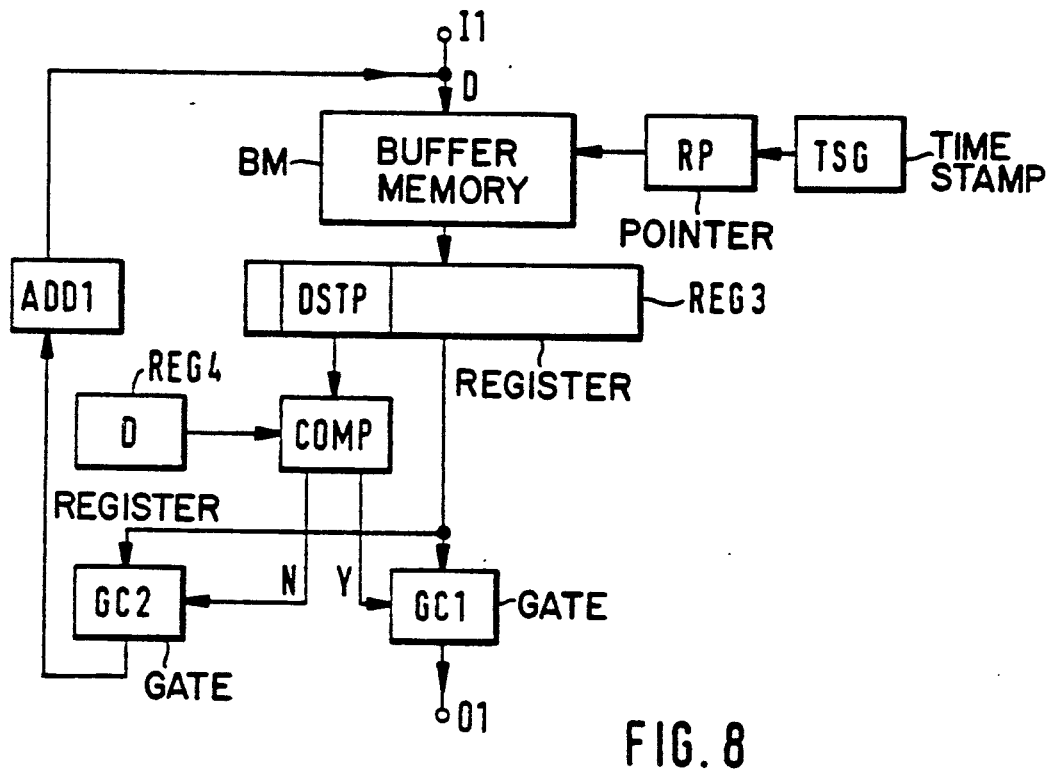

Three embodiments of the RSU1 used in the resequencing system of FIG. 5 are shown in FIGS. 6, 7 and 8. For reasons of simplicity, it is again assumed that the cells have a fixed length.

The first embodiment shown in FIG. 6 is similar to that of FIG. 2 and mainly differs therefrom in the control of the demultiplexer DEMUX and the multiplexer MUX. Use is made of a rotating or cyclic pointer ROP which controls the selection input SI2 of the multiplexer MUX and of a subtractor SUB whose output is connected to the selection input SI1 of the demultiplexer DEMUX. The subtractor SUB has a negative input to which the output of part DTSP of register REG1 is connected and a positive input connected to the output of the pointer ROP. The latter is operated cyclically and during each cycle of duration D it provides a series of delay stamp values 1 to P which are the same as those able to be measured by the delay measuring circuit DMC of FIG. 5.

Upon the receipt in register REG1 of a cell containing one of the delay stamp values 1 to P in its field DSTP this value is subtracted from the current delay stamp value then provided by the rotating pointer ROP. The resultant delay value is therefore the delay stamp value which was provided by the rotating pointer ROP at the moment the cell was applied to the input of the switching network SNW.

By storing the cell in one of the FIFO's F1 to FP allocated to this resultant time delay stamp value, one knows that it has to be maintained therein until an additional delay equal the maximum time delay D has elapsed. For this reason the cells stored in the FIFO's F1 to FP are read-out when the rotating pointer ROP reaches the delay stamp values $1+D, 2+D, \ldots, P+D$ respectively.

Reference is made to FIG. 7 which represents an embodiment of the resequencing unit RSU1, used in the resequencing system of FIG. 5. This second embodiment is similar to that of FIG. 3 and mainly differs therefrom by the fact that, just as in the embodiment of FIG. 6, use is made of a cyclic or rotating read pointer ROP and of a substractor SUB. The rotating read pointer ROP controls the read pointer RP and is connected to the plus input of the substractor SUB whose minus input is connected to the part DSTP of register REG2.

Upon the receipt in this register REG2 of a cell containing one of the delay stamp values 1 to P in its field DSTP the value is subtracted from the current delay stamp value then provided by the rotating pointer RP. The resultant delay stamp value therefore is the delay stamp value which was provided by the rotating pointer ROP at the moment the cell was applied to the input of the switching network SNW. The resultant delay stamp value, say X, is applied to the write pointer WP. In a similar way as described in relation to FIG. 3 the address A of a free buffer provided by the buffer management circuit BMC is stored in the address memory AM at the location X allocated to the resultant delay stamp value X under the control of the pointer WP. On the other hand, the cell stored in the register REG2 is written in the buffer memory BM at the location having the address A provided by the circuit BMC. This happens under the control of the read/write pointer RWP. Because the delay stamp value X is written in the allocated location X of the address memory AM and since the rotating pointer RP points to all these locations during a cycle or total time delay D it will point to this location X after the time delay D has elapsed. The cell stored in this location will thus be transferred to the output O1 after the time delay D has elapsed, as required.

In connection with FIG. 7 the same remarks are valid as those formulated with respect to FIG. 3, i.e. a number of cells may have a same resultant delay stamp value (ROP-DSTP) and for this reason a buffering function must be provided. This function will be described in relation to FIG. 10.

Reference is now made to FIG. 8 which shows a third embodiment of the resequencing unit RSU1 used in the resequencing system of FIG. 5. This third embodiment is similar to that of FIG. 4 and mainly differs therefrom by the fact that an input of the comparator COMP is now connected to the output of a register REG4 storing the total time delay value D and that no use is made of an adder circuit ADD but of an add-one circuit ADD1 in the feedback circuit linking the output of the gating circuit GC2 to the input I1 of the RSU1. Alternatively, the total time delay D can be simply a fixed code in hardware.

As already described above in relation to FIG. 4 the buffer memory BM is completely read out during each cell interval and each such cell is stored in the register REG3. The delay stamp value then stored in the field DSTP of the register REG3 is applied to the comparator COMP wherein it is compared with the total time delay D memorized in the register REG4. When the result of this comparison indicates that the time delay stored in the cell has reached the total time delay D the gating circuit GC1 is enabled and the cell is transferred to the output O1 of RSU1. On the contrary, when the total time delay D has not been reached the cell is transferred through the gating circuit GC2 to the adder circuit ADD1 wherein a 1 is added to the delay stamp value in the field DSTP of the cell. This cell is then again stored in the buffer memory BM.

It is clear that also in this case a cell is only supplied to the output O1 of RSU1 after it has been subjected to a total time delay D in the switching network and in the resequencing unit RSU1, as required.

Figure 9:
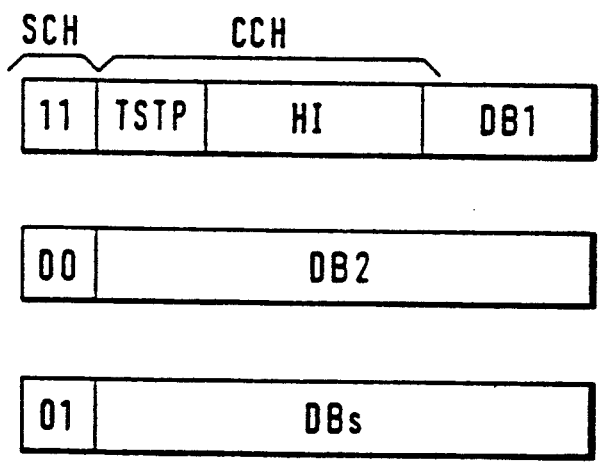
FIG. 9 represents a variable length cell.
Figure 10:
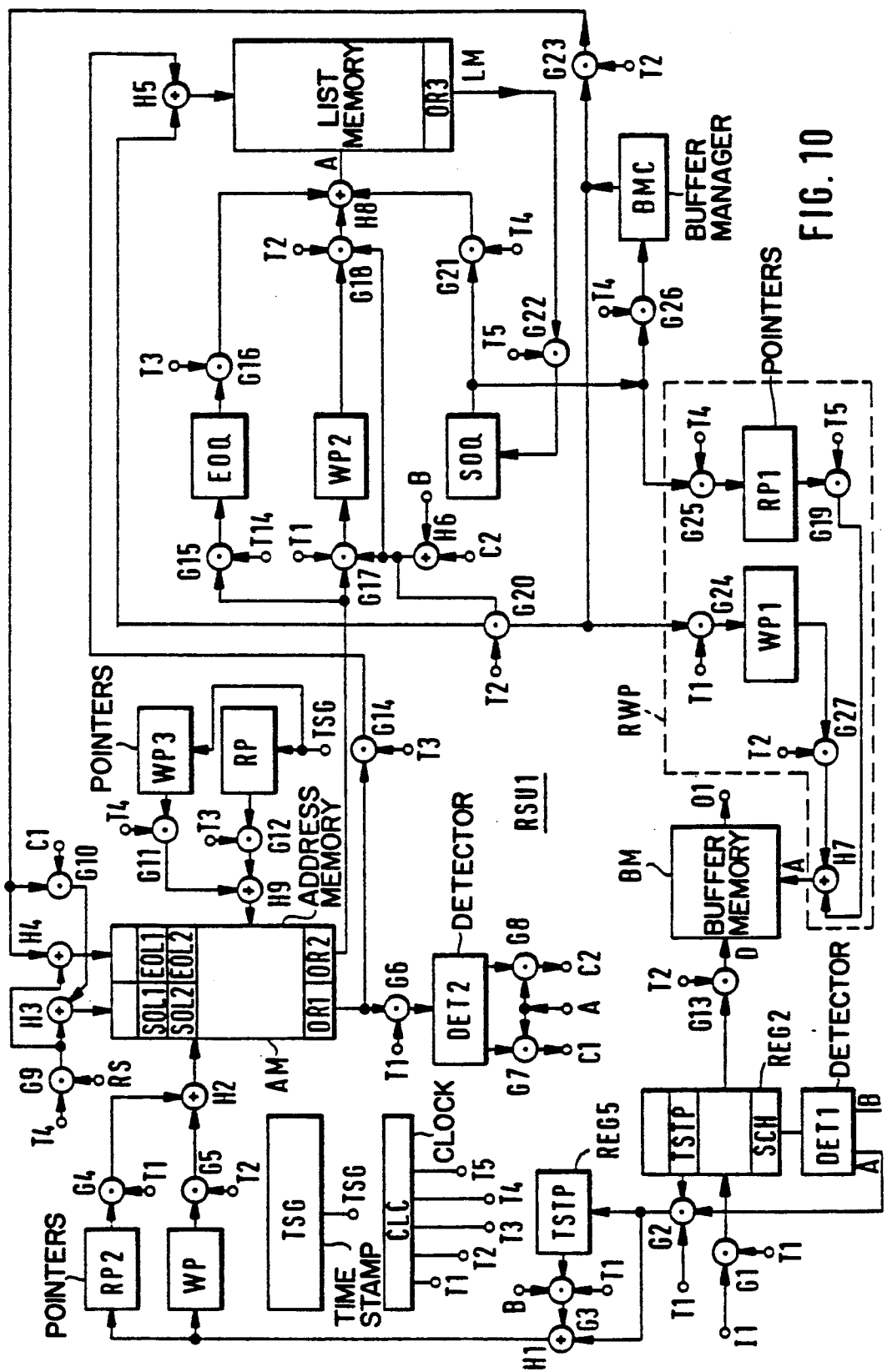
FIG. 10 shows a detailed embodiment of a resequencing system based on the principles of FIG. 3 and using the cell of FIG. 9.

Reference is now made to FIG. 10 which shows in relative detail a preferred embodiment of a resequencing unit RSU1 mainly operating according to the principles of FIG. 3 but particularly adapted to process variable length cells. Such cells are built up as a continuous string of elementary subcells and these are switched in the switching network SNW as a concatenated string over a same path and by maintaining flow continuity i.e. without subcell interleaving. An example of such a cell is shown in FIG. 9. It comprises s subcells each having a subcell control header SCH and a data field DB1 to DBs. The first subcell moreover includes a cell control header CCH comprising a time stamp field TSTP and other header information HI. The subcell control header SCH may have one of the values 11, 00 and 01 defining the first, intermediate and last subcells of a cell respectively.

The resequencing unit RSU1 shown in FIG. 10, together with the time stamp generation TSG, mainly includes:
a buffer memory BM;
an address memory AM;
a link memory LM;
registers REG2 and REG5;
a buffer management circuit BMC;
a clock circuit CLC;
read pointers RP, RP1 to RP2;
write pointers WP, WP1, WP2 and WP3;
a start-of-queue read pointer SOQ;
an end-of-queue write pointer EOQ;
detector circuits DET1 and DET2;
AND-gating circuits G1 to G2.
OR-gating circuits H1 to H9.

All these circuits are intercoupled in the way shown and which will become clear from the description of their operation. Again it should be noted that although represented by single leads the various connections may include a plurality of such leads. Also the gating circuits and the control of the write and read operations of the memories by the pointer have been represented in a schematic way which is however clear to any person skilled in the art.

The operation of the resequencing unit RSU1 is controlled by the time stamp generator TSG which provides at its output P time stamp values TS1 to TSP, per cycle of duration D. For each subcell interval the clock circuit CLG generates a series of non-overlapping gating pulses T1 to T5. The successive gating pulses T1, T2, T3, T4 and T5 define a BM write period WP, an end-of-delay period EP and a BM read-out period RP respectively.

The RAM buffer memory BM comprises a plurality of buffers each able to store a single subcell of a cell.

The address memory AM has output registers OR1/OR2 and P locations allocated to distinct ones of the P time stamp values TS1 to TSP. Each such location stores a start-of-list pointer and an end-of-list pointer for each set or list of buffer cells having a same time stamp value. These pointers store the buffer memory address SOL of the first subcell of the list as well as the buffer memory address EOL of the last subcell of this list respectively.

For each pair of start-of-list and end-of-list buffer memory addresses of AM the link memory LM stores the intermediate buffer memory addresses linking this pair of addresses. It is also used to link in a same queue the different lists associated to successive time stamp values. This happens under the control of both the start-of-queue pointer SOQ and the end-of-queue pointer EOQ and ensures that the subcells are read-out from the buffer memory BM in the correct order.

The free buffer management circuit BMC is one of those disclosed in our copending PCT patent application of even date and entitled "Communication Switching Element" (which corresponds to commonly assigned U.S. application Ser. No. 07/565,310). It manages the free/busy state of the buffers of the buffer memory BM, i.e. it provides the address of the next free buffer of this memory, makes a buffer busy when it is used and makes it free when it is no longer used.

The above three periods are considered hereafter during the relevant gating pulses.

The Write Period WP

The purpose of the operations performed during this period is to write each subcell of a received variable length cell in the buffer memory BM, to link in the address memory AM buffer memory addresses of the first and last subcells of a list of subcells belonging to cells having a same time stamp value, and to link in the link memory LM the intermediate buffer memory addresses of each list of subcells having the same TSTP value.

Two main cases should be considered:

the first is the write-in operation of the first subcell of the first variable length cell, having a predetermined time stamp value, supplied to the resequencing unit RSU1;

the second is the write-in operation of the other subcells, i.e. the second, third, etc subcells of the first cell and all the subcells of the other cells having this predetermined time stamp value.

First the write-in operation of the first subcell of a first variable length cell with a given time stamp value is considered.

Time Interval T1

When this first subcell—e.g. the first subcell of FIG. 9—is supplied to the input I1 of RSU1 it is stored in the register REG2 thereof via the enabled gating circuit G1.

The detector DET1 associated to the part SCH of the register REG5 checks if the subcell control header SCH of the subcell being processed indicates that this subcell is a first one (SCH equal to 11) or not (SCH equal to 00 or 01) and accordingly activates its output A for a first subcell or its output B if the subcell is not a first one. Since it was assumed that the subcell being processed is a first one the output A of DET1 is activated. As a consequence the gating circuit G2 associated to the part TSTP of the register REG2 storing the time stamp value, e.g. TS1, contained in the subcell is enabled. Thus this time stamp value TS1 is entered in the read and write pointers RP2 and WP via the gating circuits G2 and H1 as well as in the register REG5 via the gating circuit G2. During the time interval T1 also the gating circuit G4 connected to memory AM via the OR-gating circuit H2 is enabled so that the memory AM is then read out at the address TS1 stored in the read pointer RP2. As a consequence the pointer values SOL1 and EOL1 having the address TS1 are transferred into the output registers OR1 and OR2 of AM respectively.

The output of register OR1 is coupled to the detector circuit DET2 via the enabled gating circuit G6 so that this detector DET2 is operated. The latter thereby activates its output C1 or C2 via the respective gating circuit G7 or G8 depending on the code stored in the register OR1 being zero or not and since the input A is activated. As an example, a zero SOL code is indicative of the fact that no first subcell having this time stamp value TS1 has already been received and that this is the first subcell to be processed for the value TS1, whereas another SOL code indicates that the received subcell is not the first subcell of a first cell for the time stamp value TS1.

Because the subcell was supposed to be the first one of a first variable length cell with time stamp value TS1 the output C1 is activated.

The buffer management circuit BMC provides the address, e.g. A1, of a next free buffer in the memory BM and applies this address to the write pointer WP1, associated to the buffer memory BM, via the enabled gating circuit G24. To be noted is that the write pointer WP1 and the read pointer RP1 together constitute the read-/write pointer RWP of FIG. 3.

Because none of the signals B and C2 is activated for the first subcell of the first cell the gating circuits G17 and G20 are both inhibited.

Time Interval T2

The above address A1 of the free buffer is applied to the left and right hand parts of the address memory AM via the enabled gating circuits G23, G10, H3 and G3, H4. Because the gating circuit G5 associated to the write pointer WP is enabled the address A1 of the free buffer of BM is written in the locations SOL1 and EOL1 of AM having the address TS1. Thus the start and end pointers of a new linked list for the time stamp value TS1 are initialised.

Moreover, the subcell stored in register REG2 is applied to the buffer memory BM via the enabled gating circuit G13 and it is stored therein in the buffer with address A1 memorised in the write pointer WP1. This happens when this address is applied to the buffer memory BM via the gating circuits G27 and H7.

During the time interval T2 the circuit BMC also selects a next free buffer in the memory BM in preparation of the next write period WP.

In case the subcell being processed is not the first one (so that output B of detector DET1 is then activated) or does not belong to a first cell for the time stamp value TS1 (so that output C2 of detector DET2 is then activated) similar operations are performed as described above for the first subcell of a first cell, but these are followed by additional operations.

To be noted, however, is that during these similar operations, and for instance for the second subcell of FIG. 9, the time stamp value TS1 memorised in the register REG5 is now applied to the read and write pointers RP2 and WP via the gating circuit G3 and H1 and that the address, e.g. A2, of a free buffer is not stored in the left hand part of AM because the signal C1 is de-activated for this cell.

The additional operations are the following:

Time Interval T1

The address EOL1=A1 now stored in the output register OR2 of the memory AM is registered in the write pointer WP2 via the enabled gating circuit G17.

Time Interval T2

The address A2 provided by BMC is stored in the memory LM via the gating circuits G20 and H5 due to the fact that the signal C2 controlling the gating circuit H6 is activated. This storage happens at the address A2 stored in the write pointer WP2 and via gates G18 and H8. Thus the address A2 of the buffer of the memory BM just used for storing the second subcell is linked to the previous end-of-list address EOL1=A1 stored in WP2.

From the above it follows that the address A2 of the buffer used for storing the second subcell has been added to the list allocated to the time stamp value TS1 because it has been written in the corresponding EOL1 of the memory AM and has been linked with the previous EOL1=A1 in the memory LM.

Because the above considered variable length cell with time stamp value TS1 comprises s subcells, all these subcells are stored in different buffers of the buffer memory BM. The pointers SOL1 and EOL1 stored in the memory AM and allocated to this time stamp value TS1 thereby evolve as indicated in the following table which also shows the first list of linked addresses which is meanwhile written in the memory LM.

| AM | | LM | |
|---|---|---|---|
| SOL1 | EOL1 | Pointer addresses | Buffer addresses |
| 0 | — | | |
| A1 | A1 | | |
| A1 | A2 | A1 | A2 |
| A1 | A3 | A2 | A3 |
| . | . | . | . |
| . | . | . | . |
| A1 | A (s − 1) | . | . |
| A1 | A (s) | A (s − 1) | A (s) |

If the above considered variable length cell with time stamp TS1 is for instance followed by two variable length cells having a same time stamp value TS2 and comprising p and q subcells respectively, the pointers SOL2 and EOL2 stored in the memory AM and allocated to TS2 evolve as represented in the table below. The latter also shows the second list of linked addresses meanwhile written in the memory LM.

| AM | | LM | |
|---|---|---|---|
| SOL2 | EOL2 | Pointer addresses | Buffer addresses |
| 0 | — | | |
| B1 | B1 | | |
| B1 | B2 | B1 | B2 |
| B1 | B3 | B2 | B3 |
| . | . | . | . |
| . | . | . | . |
| B1 | B (p − 1) | . | . |
| B1 | B (p) | B (p − 1) | B (p) |
| B1 | B (p + 1) | B (p) | B (p + 1) |
| . | . | . | . |
| . | . | . | . |
| B1 | B (p + q) | B (p + q − 1) | B (p + q) |

After reception of these two variable length cells having the same time stamp value TS2, all buffer addresses B1 to B(p+q) of corresponding subcells are concatenated as a single linked list in memory LM, and the respective start and end of list pointers SOL2 and EOL2 are stored in row TS2 of memory AM.

The End-of-Delay Period EP

The purpose of the operations performed during the time intervals T3 and T4 of such a period is to link the complete list—which has been built up in the way described above and which is allocated to a distinct one of the time stamp values—into a single read-out queue when the compensating second time delay expires. This happens from the moment all the subcells included in such a list have been delayed over the above mentioned total time delay D and are therefore ready for being transferred to the output O1.

As described in relation with FIG. 3 this happens for each location of the memory AM when the address thereof is stored in the cyclic read pointer RP controlled by the time stamp generator TSG. This means that when the pointer RP contains the address or time stamp value TS1 of the location storing the pointers SOL1=A1 and EOL1=A(s) the s subcells of this first linked list are ready to be read out in the order A1, A2, . . . A(s) stored in the memory LM, whilst when the pointer RP contains the address or time stamp value TS2 of the location storing SOL2=B1 and EOL2=B(p+q) the p+q subcells of the second linked list are ready to be read out in the order B1, B2, . . . B(p+q) stored in the memory LM. To be able to perform this reading-out operation of the subcells of these first and second lists in succession with previous lists and with following lists, they are put in a continuous output queue.

To facilitate the description of the preparation of this queuing operation it is assumed that already requested lists, if any, preceding the above two lists have been queued and that the current start address of this queue is SOQ=X whilst the current end address thereof is EOQ=Y.

During the time intervals T3 and T4 of the time stamp interval TS1 provided by the time stamp generator TSG, the following operations are performed.

Time Interval T3

Because the read pointer RP contains the address TS1 and the gating circuit G12 is enabled, the start-of-list address SOL1=A1 as well as the end-of-list address EOL1=A(s) are read from the memory AM and stored into the respective output registers OR1 and OR2 thereof.

The start-of-list address SOL1=A1 is then applied to the memory LM via the enabled gating circuits G14 and H5 and because the gating circuit G16 is enabled it is written in this memory at the end-of-queue address Y stored in the end-of-queue pointer EOQ.

Thus the start address of the above first linked list, with SOL1=A1 and EOL1=A(s), is linked to the end address EOQ=Y of the output queue which has been built up until then. Hence, the above first linked list is linked to the previous linked list of the output queue.

Time Interval T4

The end-of-list address EOL1=A(s) stored in the output register OR2 of AM is transferred via the enabled gating circuit G15 into the end-of-queue write pointer EOQ where it is substituted for the value Y. Thus the end address EOL1=A(s) of the above first list becomes the new end address EOQ of the output queue.

The address A1 stored in the start-of-queue read SOQ is applied to the read pointer RP1 via the enabled gating circuit G25. It is also applied via the gating circuit G26 to the buffer management circuit BMC for being released thereby.

The gating circuit G21 being enabled the address A2 stored at the address A1 is read-out from the memory LM and stored in the output register OR3 thereof.

Supposing that the reset signal RS is activated so that the gating circuit G9 is enabled, and because also the gating circuits G11 and H9 are enabled, a zero value is written in the locations storing SOL1 and EOL1 having the address TS1 provided to the write pointer WP3 by the time stamp generator TSG.

In a similar way, when SOL2 and EO2 of the above second list are read during the time stamp interval TS2:
the start address SOL2=B1 of the second list is linked in the memory LM with the end-of-queue address EOQ=A(s);
the end-of-list address EOL2=B(p=q) of the second list becomes the new end-of-queue address. Thus the second list is linked to the first and is included in the output queue.

In a similar way other lists are linked in the queue whose final end address, e.g. Z, is stored in the pointer EOQ.

The Read-Out Period PR

The purpose of the operations performed during such a period or time interval T5 is to successively read out from the memory BM the subcells forming part of the above formed output queue.

For reasons of simplicity, it is assumed that the subcells forming part of the linked lists preceding the above first and second ones, if any, have already been read out. This means that the start-of-queue address A1 of the first list is stored in SOQ whilst the end of queue address stored in EOQ is Z, as already mentioned.

Because the gating circuit G19 is enabled the read pointer RP1 reads out the subcell from the buffer memory BM at the start-of-queue address A1 and applies it to the output O1 of RSU1.

The circuit BMC effectively releases the buffer wherein subcell read out was stored.

The gating circuit G22 being enabled, the address A2 stored in the output register OR3 is transferred into the start-of-queue pointer SOQ.

In this way the subcells stored in the buffer memory BM are read out in the correct order.

A resequencing system based on the principles of FIG. 7 may easily be derived from the resequencing system of FIG. 10 which operates according to the principles of FIG. 3.

The resequencing system of FIG. 10 may also be easily adapted for processing cells comprising a fixed number of subcells e.g. a number n. Indeed, in this case:
instead of using a subcell control header SCH to define the subcells, the n subcells should be defined by respective ones of n count numbers;
the buffer management circuit BMC should provide the addresses of free cell buffers instead of free subcell buffers and release them when they are cleared;
the memories AM and LM should manage cells instead of subcells;
the memory BM should still operate for write and read on a subcell basis, but a counter should be provided for each memory access to count 1 to n subcells per cell at address specific subcell locations in the concerned cell buffer area.

The resequencing system of FIG. 10 can also be used for processing separate fixed length cells and not subdivided in subcells. In this case:
the system should handle cells instead of subcells;
a distinction should only be made between the first cell and the following cells for a given TSTP value (cases C1 and C2 above)
the register REG5 should be eliminated.

In the resequencing system of FIG. 10 each subcell period is subdivided in a write interval, an end of delay interval and a read interval because it is assumed that each resequencing unit, such as RSU1, has one input and one output both operating at a same bitrate. In case the resequencing RSU1 unit has u inputs and v equivalent outputs coupled to a same output circuit OC1 and operating at a same bitrate one has to subdivide each subcell period in u write intervals followed by a single end of delay interval and by v read intervals. On the contrary, when the bitrate at the v outputs is w times larger than that at the u inputs each subcell period must include u read intervals, one end of delay interval and v x w read intervals in succession.

To be noted is that in the above, use is made of the word "cell" although this is specifically Asynchronous Transfer Mode terminology. However, one could also have used the word "packet".

While the principles of the invention have been described above in connection with specific apparatus, it is to be clearly understood that this description is made only by way of example and not as a limitation on the scope of the invention.

I claim:

1. A switching node for switching multi-bit cells of information, said switching node comprising:
a plurality of node inlets;
a switching network having inputs and outputs for transferring each multi-bit cell appearing at any of said node inlets from a respective input to a respective output of the switching network with a respective variable first time delay;
a plurality of node outlets; and resequencing means coupled between said switch network and said node outlets for subjecting said each multi-bit cell when it arrives at said respective output and before it appears at an associated one of said node outlets to a respective additional variable second time delay such that for each cell the sum of the two time delays is substantially equal to a predetermined total value, whereby a plurality of cells appearing at inlets of the switching node in a predetermined sequence will each be subject to a total time delay through the switching node substantially equal to said predetermined total value and said plurality of cells will thus appear at outlets of the switching node in substantially the same said sequence.

2. A switching node according to claim 1, wherein said resequencing means further comprises:
- a time stamp generator producing successive time stamp values;
- means coupled to said input to associate with each of the cells supplied thereon a first time stamp value then provided by said generator; and
- a resequencing unit coupled to said output to supply a cell received thereon to an output terminal only when said time stamp generator provides a second time stamp value equal to the sum of said first time stamp value and said predetermined total value.

3. A switching node according to claim 1, wherein said resequencing means further comprises:
- means associated with said switching network to measure said first time delay for each of said cells at said output and to associate it with these cells as a first delay stamp value; and
- a resequencing unit coupled to said output to subject a cell received thereon to said second time delay equal to the difference of said predetermined total value and said measured first delay stamp value.

4. A switching node according to claim 2, wherein said first time stamp value forms part of a time stamp field of said cell.

5. A switching node according to claim 2, wherein said resequencing unit comprises:
- an input register for storing a cell received on said output;
- a plurality of first-in-first-out storage registers allocated to distinct ones of said first time stamp values, said first time stamp values being generated by said time stamp generator in a cyclic way;
- means which couple said input register to said storage registers and are controlled by said first time stamp value associated with said cell to transfer said cell from said input register to the storage register allocated to this time stamp value; and
- means which couple said storage registers to the output terminal of said resequencing unit and are controlled by said time stamp generator to transfer said cell from said storage register to said output terminal when said time stamp generator produces a time stamp value equal to the sum of the time stamp value to which said storage register is allocated and said predetermined total value which is equal to the duration of a cycle of said generator.

6. A switching node according to claim 2, wherein said resequencing unit comprises:
- an input register for storing a cell received on said output;
- a buffer memory having an input coupled to an output of said input register and an output constituting the output of said sequencing unit;
- a buffer management circuit for managing the free/busy state of the buffers of said buffer memory and for allocating the address of a free buffer to said cell;
- a read/write pointer associated with said buffer memory;
- an address memory having sets of locations allocated to distinct ones of said time stamp values, said time stamp values being generated by said generator in a cyclic way and the duration of a cycle being equal to that of said total delay value;
- a cyclic read pointer associated with said address memory to cyclically read out the contents of the sets of locations thereof;
- a write pointer associated with said input register and said address memory for storing the time stamp value associated with said cell such that
  - subsequent to the receipt in said input register of a cell having an associated time stamp value and the allocation to said cell and by said buffer management circuit of a free buffer memory address, said free buffer memory address is written by said write pointer in one of the locations of the set of locations of said address buffer allocated to said time stamp value and said cell is written by said read/write pointer in said buffer memory at said buffer memory address and
  - when said cyclic read pointer reads said address from said address memory it supplies it to said read/write pointer which then reads said cell from said buffer memory.

7. A switching node according to claim 2, wherein said resequencing unit comprises:
- a buffer memory for storing cells received at said output;
- a register coupled to an output of said buffer memory;
- means to transfer all cells stored in said buffer memory into said input register during a cell time interval;
- an adder circuit associated with said input register to add the first delay stamp value associated with a cell stored in said input register to said predetermined total value;
- a comparator to compare the result of the adding operation with the time stamp value then provided by said generator; and gating means to supply the cell stored in said input register to the output terminal of said resequencing unit or back to said buffer memory depending on the result of the comparison.

8. A switching node according to claim 3, wherein said resequencing unit comprises:
- an input register for storing a cell received on said output a time delay generator means generating successive delay stamp values in a cyclic way, the duration of a cycle being equal to that of said total delay value;
- a subtractor circuit to subtract the first delay stamp value associated with said cell from the time delay provided by said time delay generator means thereby providing a resultant delay stamp value;
- a plurality of first-in-first-out storage registers allocated to distinct ones of said resultant delay stamp values;

means which couple said input register to said storage register and are controlled by said resultant delay stamp value to transfer said cell from said input register to the storage register allocated to the resultant delay stamp value provided by said subtractor; and means coupling said storage registers to the output terminal of said resequencing unit to transfer said cell from said storage register to said output terminal when said time delay generator means produces a delay stamp value equal to the sum of the resultant delay stamp values to which said storage register is allocated and said predetermined total value.

9. A switching node according to claim 3, wherein resequencing unit comprises:
- a buffer memory having an input coupled to an output of said input register and an output constituting the output of said resequencing unit;
- a buffer management circuit for managing the free-/busy state of the buffers of said buffer memory and for allocating the address of a free buffer to said cell;
- a read/write pointer associated with said address memory;
- a delay stamp value generator means generating successive delay stamp values in a cyclic way, the duration of a cycle being equal to that of said total delay value;
- a subtractor circuit to subtract the first delay stamp value associated with said cell from the delay stamp value provided by said delay stamp generator means, thereby providing a resultant delay stamp value;
- an address memory having sets of locations allocated to distinct ones of said resultant delay stamp values provided by said subtractor circuit;
- a write pointer associated with said address memory and able to store therein the resultant delay stamp value provided by said subtractor circuit; and
- a cyclic read pointer controlled by said generator and associated with said address memory to cyclically read out the contents of the sets of locations thereof such that
  - subsequent to the receipt in said input register of a cell having an associated first delay stamp value and the allocation to said cell and by said buffer management circuit of a free buffer memory address, said free buffer memory address is written by said write pointer in one of the locations of the set of locations of said address buffer allocated to said resultant delay stamp value and said cell is written by said read/write pointer in said buffer memory at said buffer memory address and
  - when said read pointer reads said address from said address memory it supplies it to said read/write pointer which then reads said cell from said buffer memory.

10. A switching node according to claim 3, wherein said output means further comprises:
- a buffer memory for storing cells received at said output;
- a register coupled to an output of said buffer memory;
- means to transfer all cells stored in said buffer memory into said input register during a cell time interval;
- a comparator to compare the first delay stamp value associated with a cell stored in said input register with said predetermined total value; and
- gating means to supply the cell stored in said input register to the output terminal of said output means or back to said buffer memory depending on the result of the comparison, the time value of a fed back cell being incremented by 1 in an add-one circuit.

11. A switching node according to claim 3, wherein said first time delay is contained in a time delay field of said cell.

12. A switching node according to claim 6, wherein in order to perform the resequencing of cells which are each constituted by a series of subcells and are applied to an input of said resequencing unit, the latter is adapted during a write-in operation to build up lists of buffer memory addresses at which said subcells are written in said buffer memory, the addresses of each list belonging to subcells of cells having a same stamp value provided by said write pointer, to arrange during an end-of-delay operation said lists in an output queue in the order provided by said read pointer, and to read out during a read-out operation the subcells from said buffer memory in the order in which their addresses are stored in said queue and apply them to an output of the resequencing unit.

13. A switching node according to claim 12, wherein said resequencing unit further comprises a link memory used to chain the buffer memory addresses of successive subcells of all cells having the same stamp value and builds up a said list by storing in said address memory, and at the address provided by said write pointer, the start-of-list and end-of-list buffer memory addresses of the first and last subcells of said list and by storing in said link memory the intermediate subcell addresses linking said start and end-of-list addresses.

14. A switching node according to claim 13, wherein subsequent to the receipt of a subcell in said input register, said resequencing unit detects whether said subcell is the first one of a first cell of a list or set of cells having a same time stamp value or resultant delay stamp value, and accordingly either initializes an absent list in said address memory at the address provided by said write pointer or updates an existing list in said address memory and in said link memory.

15. A switching node according to claim 14, wherein said initialization operation is performed by making said start-of-list and end-of-list addresses both equal to the buffer memory address allocated to said first received subcell by said buffer management circuit.

16. A switching node according to claim 14, wherein said updating operation of said address memory is performed by making said end-of-list address equal to the buffer memory address of said received subcell, while the updating of said link memory is performed by storing the buffer memory address of said received subcell in said link memory at the end-of-list address.

17. A switching node according to claim 13, wherein said resequencing unit further comprises a start-of-queue read pointer and an end-of-queue write pointer which are both associated with said link memory, and subsequent to the reading of start-of-list and end-of-list addresses of a list from said address memory by said read pointer, includes said list in a queue by storing said start-of-list address into said link memory at the address provided by said end-of-queue write pointer and by subsequently storing said end-of-list address in said end-of-queue pointer.

18. A switching node according to claim 17, wherein during a buffer memory read-out operation said start-of-queue pointer provides a buffer memory address to said buffer memory and reads out said link memory at this address, the thus obtained address being fed back to said start-of-queue pointer.

19. A switching node according to claim 14, wherein said resequencing unit further comprises reset means to reset said address memory during a buffer memory read-out operation to indicate the absence of a list.

20. A switching node according to claim 14, wherein
said first time stamp value forms part of a time stamp field of said cell, and
said subcells each contain a code for indicating whether the subcell is the first one of a cell and
said switching node further comprises detection means to detect whether a subcell stored in said input register is the first subcell of a first cell, said detection means further comprising:

a first detection circuit which is coupled to said input register for reading said code and for providing an output signal indicating whether the subcell is a first subcell;

a second read pointer coupled to said address memory to read out this memory at the address derived from said stamp value of said subcell; and a second detection circuit coupled to said address memory to check by using said output signal whether the start-to-list address read by said second read pointer indicates that said first subcell belongs to a first cell.

21. A switching node according to claim 12, wherein
said resequencing unit has u inputs and v outputs coupled to a same output circuit, the bitrate of said cells at each of said v outputs being w times the bitrate of said cells at each of said u inputs and
the resequencing unit in a subcell interval successively performs u write-in operations, a single end-of-delay operation and v x w read-out operations.

* * * * *